US010559070B2

(12) United States Patent
Tang

(10) Patent No.: US 10,559,070 B2
(45) Date of Patent: *Feb. 11, 2020

(54) IMAGE PROCESSING METHOD AND APPARATUS, AND ELECTRONIC DEVICE

(71) Applicant: GUANGDONG OPPO MOBILE TELECOMMUNICATIONS CORP., LTD., Dongguan (CN)

(72) Inventor: Cheng Tang, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/193,734

(22) Filed: Nov. 16, 2018

(65) Prior Publication Data

US 2019/0122337 A1    Apr. 25, 2019

Related U.S. Application Data

(63) Continuation of application No. 15/805,355, filed on Nov. 7, 2017.

(30) Foreign Application Priority Data

Nov. 29, 2016   (CN) .......................... 2016 1 1079623

(51) Int. Cl.
*G06T 5/00* (2006.01)
*H04N 5/235* (2006.01)
(Continued)

(52) U.S. Cl.
CPC ............ *G06T 5/007* (2013.01); *G06T 3/4007* (2013.01); *G06T 3/4015* (2013.01); *G06T 5/002* (2013.01);
(Continued)

(58) Field of Classification Search
None
See application file for complete search history.

(56) References Cited

U.S. PATENT DOCUMENTS

2005/0030394 A1* 2/2005 Mendis .................. H04N 5/367
                                                            348/246
2006/0245014 A1   11/2006 Haneda
(Continued)

FOREIGN PATENT DOCUMENTS

CN    101742335 A    6/2010
CN    102985808 A    3/2013
(Continued)

OTHER PUBLICATIONS

Chinese Patent Application No. 201611079623.8 First Office Action dated Dec. 12, 2017, 6 pages.
(Continued)

*Primary Examiner* — Mekonen T Bekele
*Assistant Examiner* — Nathan J Bloom
(74) *Attorney, Agent, or Firm* — Lathrop Gage LLP

(57) ABSTRACT

An image processing method is provided. The image processing method is applied in an electronic device. The array of photosensitive pixel units is controlled to expose with different exposure parameters and output multiple frames of color-block image. Each frame of color-block image includes image pixel units arranged in a preset array, each image pixel unit includes a plurality of original pixels, and each photosensitive pixel corresponds to one original pixel. The multiple frames of color-block image are merged to obtain a HDR color-block image. The HDR color-block image is converted to a simulation image using an interpolation algorithm. The simulation image includes simulation pixels arranged in an array, and each photosensitive pixel
(Continued)

corresponds to one simulation pixel. An image processing apparatus and an electronic device are also provided.

18 Claims, 15 Drawing Sheets

(51) Int. Cl.
    *H04N 9/04*     (2006.01)
    *G06T 5/50*     (2006.01)
    *G06T 7/90*     (2017.01)
    *G06T 3/40*     (2006.01)

(52) U.S. Cl.
    CPC ............... *G06T 5/50* (2013.01); *G06T 7/90* (2017.01); *H04N 5/2356* (2013.01); *H04N 9/045* (2013.01); *G06T 2207/10024* (2013.01); *G06T 2207/10144* (2013.01); *G06T 2207/20208* (2013.01)

(56) References Cited

U.S. PATENT DOCUMENTS

| | | | |
|---|---|---|---|
| 2008/0158396 A1* | 7/2008 | Fainstain | H04N 5/361 348/246 |
| 2009/0073292 A1 | 3/2009 | Castorina et al. | |
| 2010/0128039 A1 | 5/2010 | Cho et al. | |
| 2013/0021492 A1 | 1/2013 | Tatsuzawa et al. | |
| 2013/0051665 A1 | 2/2013 | Shinozaki | |
| 2014/0253808 A1* | 9/2014 | Tachi | H04N 9/045 348/624 |
| 2015/0192758 A1* | 7/2015 | Yamagata | G02B 5/3025 348/360 |
| 2016/0181304 A1* | 6/2016 | Ishiwata | H01L 27/14621 257/432 |
| 2017/0366723 A1* | 12/2017 | Kurata | G06T 3/4015 |
| 2018/0288336 A1* | 10/2018 | Aokage | H04N 5/2621 |
| 2018/0357750 A1* | 12/2018 | Chen | G06T 3/4015 |

FOREIGN PATENT DOCUMENTS

| | | |
|---|---|---|
| CN | 103004211 A | 3/2013 |
| CN | 103190145 A | 7/2013 |
| CN | 103748868 A | 4/2014 |
| CN | 104253946 A | 12/2014 |
| CN | 105578075 A | 5/2016 |
| CN | 105578080 A | 5/2016 |
| CN | 106162112 A | 11/2016 |
| CN | 106507080 A | 3/2017 |
| CN | 106791477 A | 5/2017 |
| EP | 2753082 A1 | 7/2014 |
| TW | 563365 B | 11/2003 |

OTHER PUBLICATIONS

Chinese Patent Application No. 201611079623.8 English translation of First Office Action dated Dec. 12, 2017, 6 pages.
PCT/CN2017/087557 International Search Report and Written Opinion dated Jul. 28, 2017, 12 pages.
European Patent Application No. 17201321.1 extended Search and Opinion dated Apr. 20, 2018, 11 pages.
Chinese Patent Application No. 201611079623.8 English translation of Notification to Grant Patent Right for Invention dated Jun. 5, 2018, 2 pages.
Chinese Patent Application No. 201611079623.8, Notification to Grant Patent Right for Invention dated Jun. 5, 2018, 4 pages.
Chinese Patent Application No. 201611079623.8, English translation of the Allowed Claims allowed Jun. 5, 2018, 6 pages.

\* cited by examiner

| R | R | Gr | Gr |
|---|---|----|----|
| R | R | Gr | Gr |
| Gb | Gb | B | B |
| Gb | Gb | B | B | color-block image

Fig. 6

IMAGE PROCESSING METHOD AND APPARATUS, AND ELECTRONIC DEVICE

CROSS-REFERENCE TO RELATED APPLICATIONS

This application is a continuation application of a U.S. patent application Ser. No. 15/805,355, filed Nov. 7, 2017, which claims priority to Chinese Patent Application No. 201611079623.8, filed Nov. 29, 2016, each of which is incorporated by reference in its entirety.

FIELD

The present disclosure relates to the imaging technology field, and more particularly to an image processing method, an image processing apparatus and an electronic device.

BACKGROUND

When an image is processed using a conventional image processing method, either the obtained image has a low resolution, or it takes a long time and too much resource to obtain a HDR (high dynamic range) image, both of which are inconvenient for users.

DISCLOSURE

The present disclosure aims to solve at least one of existing problems in the related art to at least some extent. Accordingly, the present disclosure provides an image processing method, an image processing apparatus and an electronic device.

Embodiments of the present disclosure provide an image processing method. The image processing method is applied in an electronic device. The electronic device includes an image sensor. The image sensor includes an array of photosensitive pixel units and an array of filter units arranged on the array of photosensitive pixel units. Each filter unit corresponds to one photosensitive pixel unit, and each photosensitive pixel unit includes a plurality of photosensitive pixels. The image processing method includes: controlling the array of photosensitive pixel units to expose with different exposure parameters and output multiple frames of color-block image, in which, each frame of color-block image includes image pixel units arranged in a preset array, each image pixel unit includes a plurality of original pixels, and each photosensitive pixel corresponds to one original pixel; merging the multi-frame color-block image to obtain a HDR color-block image; and converting the HDR color-block image into a simulation image using an interpolation algorithm, in which, the simulation image includes simulation pixels arranged in an array, and each photosensitive pixel corresponds to one simulation pixel.

Embodiments of the present disclosure further provide an image processing apparatus. The image processing apparatus is applied in an electronic device. The electronic device includes an image sensor. The image sensor includes an array of photosensitive pixel units and an array of filter units arranged on the array of photosensitive pixel units. Each filter unit corresponds to one photosensitive pixel unit, and each photosensitive pixel unit includes a plurality of photosensitive pixels. The image processing apparatus includes a non-transitory computer-readable medium including computer-readable instructions stored thereon, and an instruction execution system which is configured by the instructions to implement at least one of a control module, a merging module and a converting module. The control module is configured to control the array of photosensitive pixel units to expose with different exposure parameters and output multiple frames of color-block image. Each frame of color-block image includes image pixel units arranged in a preset array. Each image pixel unit includes a plurality of original pixels, and each photosensitive pixel corresponds to one original pixel. The merging module is configured to merge the multiple frames of color-block image to obtain a HDR color-block image. The converting module is configured to convert the HDR color-block image into a simulation image using an interpolation algorithm. The simulation image includes simulation pixels arranged in an array, and each photosensitive pixel corresponds to one simulation pixel.

Embodiments of the present disclosure provide an electronic device. The electronic device includes a housing, a processor, a memory, a circuit board, a power supply circuit and an imaging apparatus. The circuit board is enclosed by the housing. The processor and the memory are positioned on the circuit board. The power supply circuit is configured to provide power for respective circuits or components of the electronic device. The imaging apparatus includes an image sensor. The image sensor includes an array of photosensitive pixel units and an array of filter units arranged on the array of photosensitive pixel units. Each filter unit corresponds to one photosensitive pixel unit, and each photosensitive pixel unit includes a plurality of photosensitive pixels. The memory is configured to store executable program codes. The processor is configured to run a program corresponding to the executable program codes by reading the executable program codes stored in the memory, to perform the image processing method according to embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings.

FIG. 6 is a schematic diagram of a color-block image according to an embodiment of the present disclosure.

11 is a flow chart of an image processing method according to an embodiment of the present disclosure.

Figure 12:
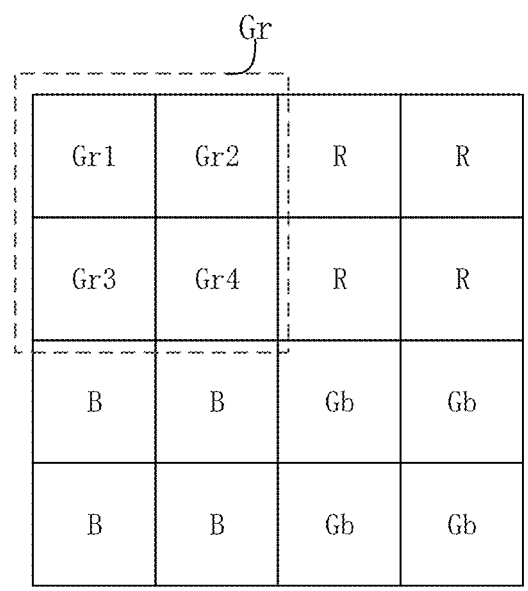

FIG. 12 is a schematic diagram showing an image pixel unit of a color-block image according to an embodiment of the present disclosure.

Figure 13:
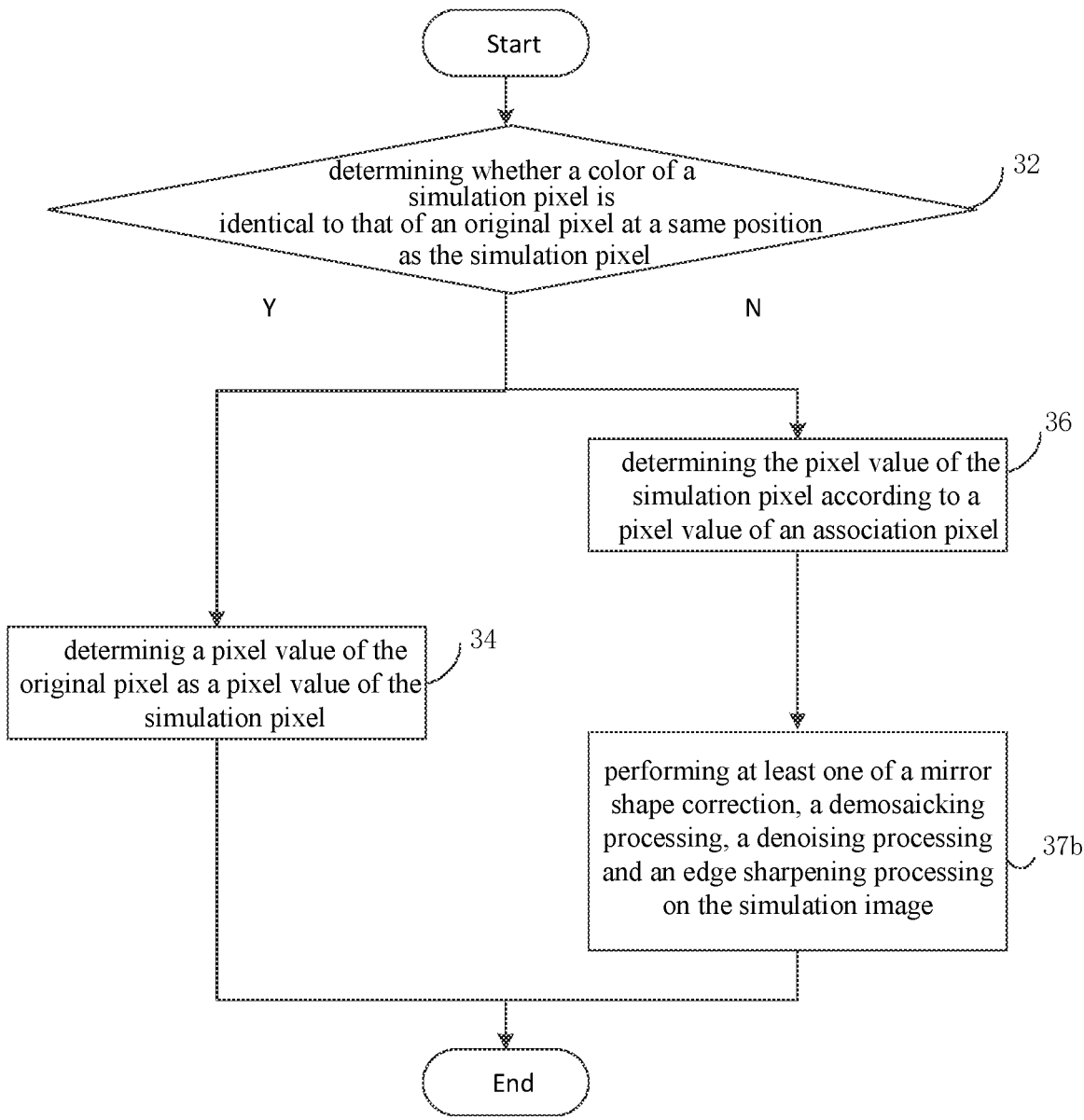

FIG. 13 is a flow chart of an image processing method according to an embodiment of the present disclosure.

Figure 14:
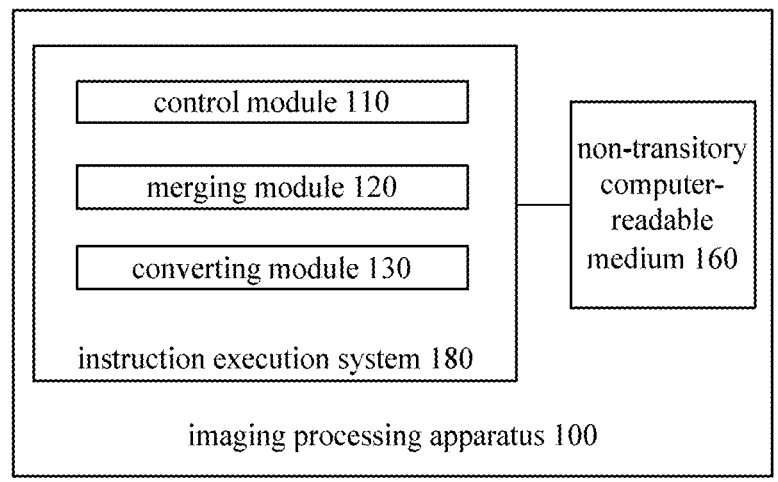

FIG. 14 is a block diagram of an image processing apparatus according to an embodiment of the present disclosure.

Figure 15:
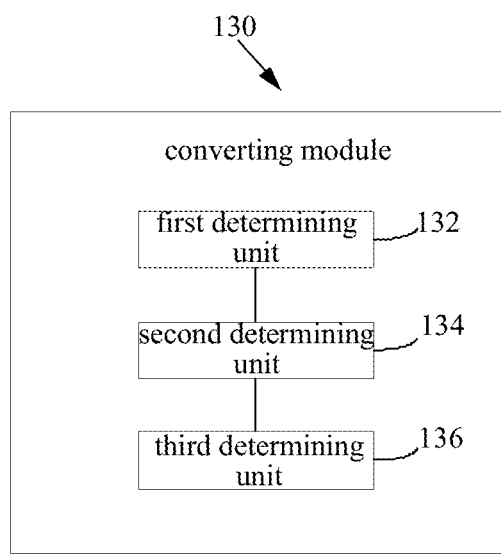

FIG. 15 is a block diagram of a converting module according to an embodiment of the present disclosure.

Figure 16:
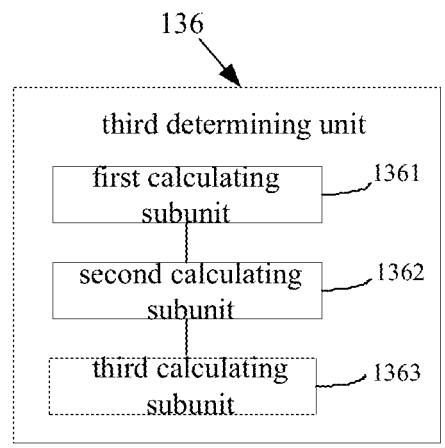

FIG. 16 is a block diagram of a third determining unit in the converting module according to an embodiment of the present disclosure.

Figure 17:
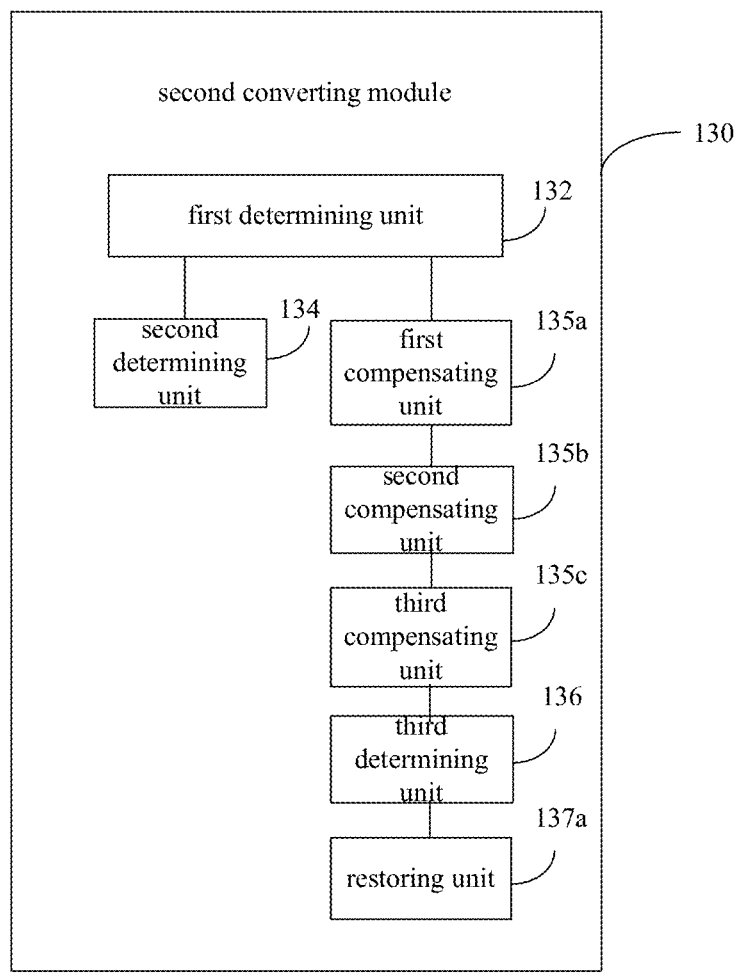

FIG. 17 is a block diagram of an image processing apparatus according to another embodiment of the present disclosure.

Figure 18:
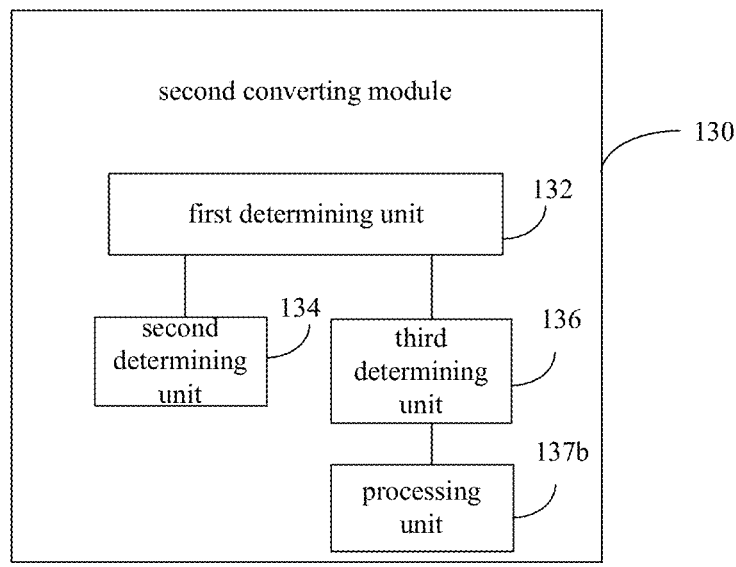

FIG. 18 is a block diagram of an image processing apparatus according to another embodiment of the present disclosure.

Figure 19:
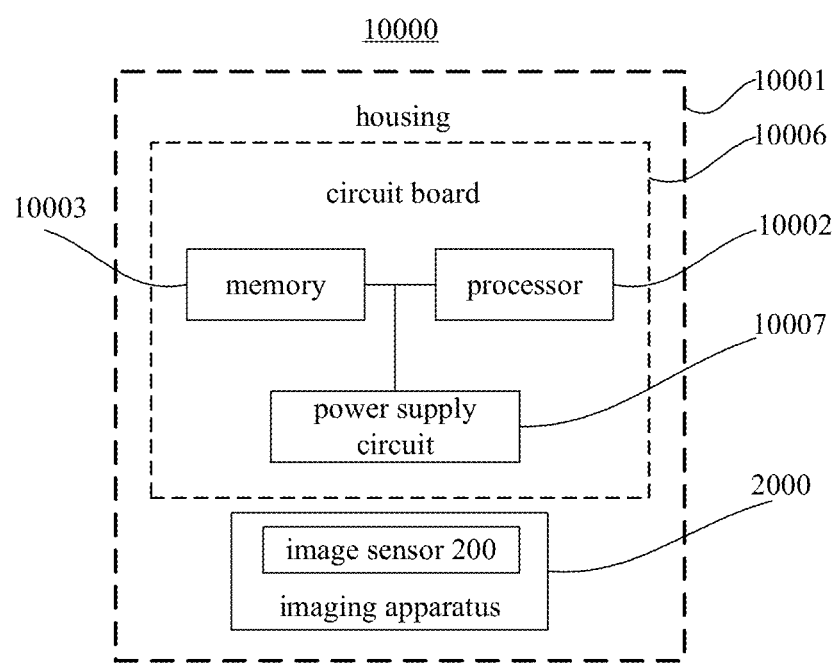

FIG. 19 is a block diagram of an electronic device according to an embodiment of the present disclosure.

EMBODIMENTS OF THE PRESENT DISCLOSURE

Reference will now be made in detail to exemplary embodiments, examples of which are illustrated in the accompanying drawings, in which the same or similar reference numbers throughout the drawings represent the same or similar elements or elements having same or similar functions. Embodiments described below with reference to drawings are merely exemplary and used for explaining the present disclosure, and should not be understood as limitation to the present disclosure.

In the related art, an image sensor includes an array of photosensitive pixel units and an array of filter units arranged on the array of photosensitive pixel unit. Each filter unit corresponds to and covers one photosensitive pixel unit, and each photosensitive pixel unit includes a plurality of photosensitive pixels. When working, the image sensor is controlled to output a merged image, which can be converted into a merged true-color image by an image processing method and saved. The merged image includes an array of merged pixels, and the photosensitive pixels in a same photosensitive pixel unit are collectively outputted as one merged pixel. Thus, a signal-to-noise ratio of the merge image is increased. However, a resolution of the merged image is reduced.

Certainly, the image sensor can be controlled to output a high pixel color-block image, which includes an array of original pixels, and each photosensitive pixel corresponds to one original pixel. However, since a plurality of original pixels corresponding to a same filter unit have the same color, the resolution of the color-block image still cannot be increased. Thus, the high pixel color-block image needs to be converted into a high pixel simulation image by an interpolation algorithm, in which the simulation image includes a Bayer array of simulation pixels. However, when a high dynamic range (HDR for short) function is applied, a multi-frame simulation image of different brightness is needed, that is, multiple interpolation calculations are needed, thereby consuming resource and time.

Thus, embodiments of the present disclosure provide a novel image processing method.

Figure 1:
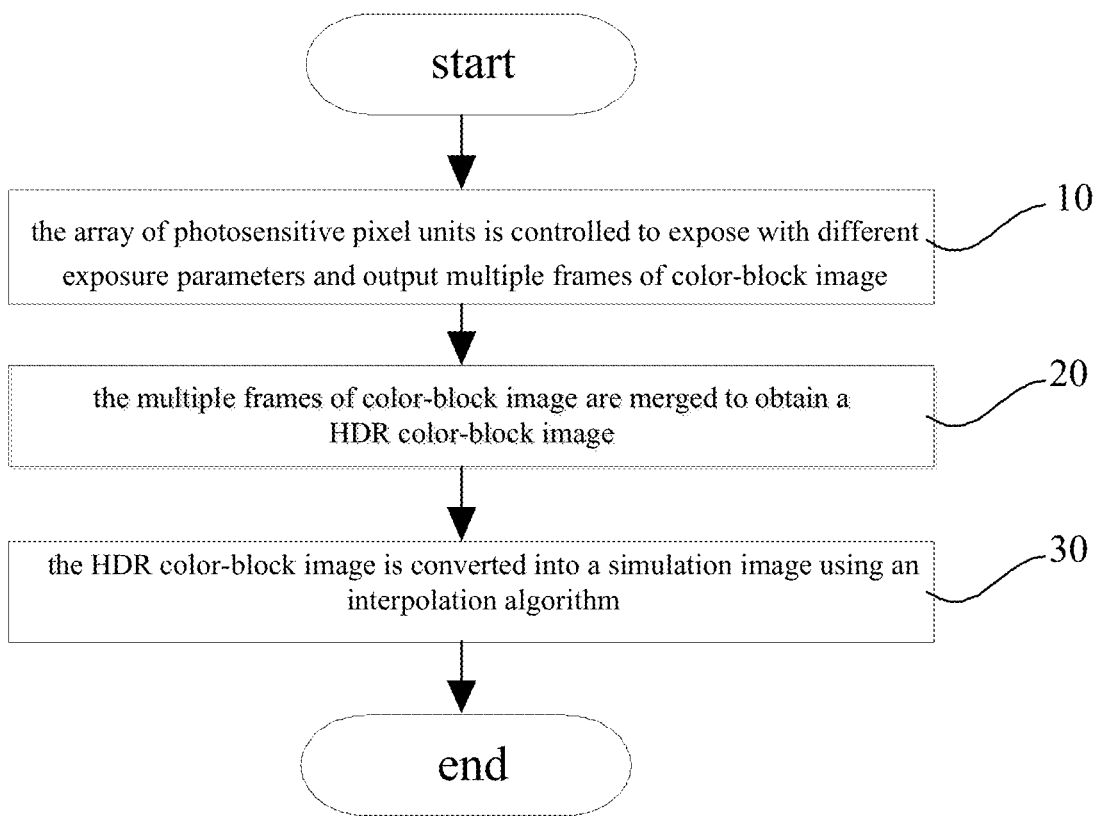
FIG. 1 is a flow chart of an image processing method according to an embodiment of the present disclosure.
Figure 2:
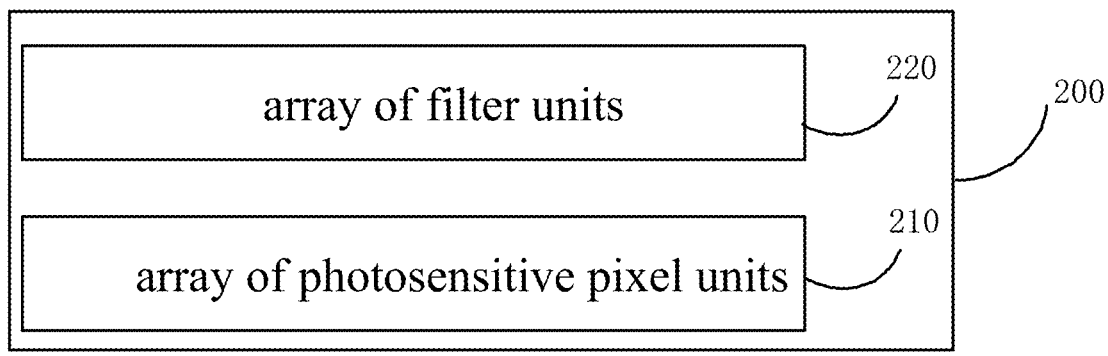
FIG. 2 is a block diagram of an image sensor according to an embodiment of the present disclosure.
Figure 3:
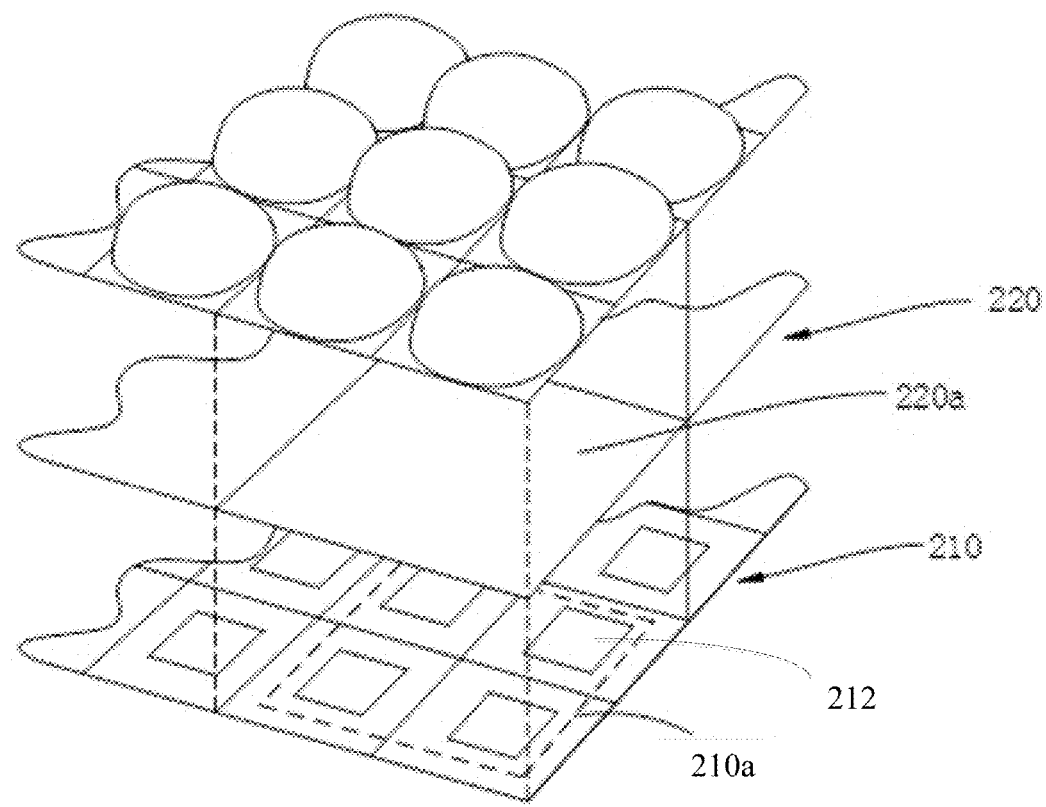
FIG. 3 is a schematic diagram of an image sensor according to an embodiment of the present disclosure.

Referring to FIG. 1, an image processing method is illustrated. The image processing method is applied in an electronic device. The electronic device includes an imaging apparatus including an image sensor. As illustrated in FIG. 2, the image sensor 200 includes an array 210 of photosensitive pixel units and an array 220 of filter units arranged on the array 210 of photosensitive pixel units. As illustrated in FIG. 3, each filter unit 220a corresponds to one photosensitive pixel unit 210a, and each photosensitive pixel unit 210a includes a plurality of photosensitive pixels 212. In at least one embodiment, there is a one-to-one correspondence between the filter units and the photosensitive pixel units. The image processing method includes the following.

At block 10, the array of photosensitive pixel units is controlled to expose with different exposure parameters and output multiple frames of color-block image.

Each frame of color-block image includes image pixel units arranged in a preset array. Each image pixel unit includes a plurality of original pixels, and each photosensitive pixel corresponds to one original pixel. In at least one embodiment, there is a one-to-one correspondence between the photosensitive pixels and the original pixels.

At block 20, the multiple frames of color-block image are merged to obtain a HDR color-block image.

At block 30, the HDR color-block image is converted into a simulation image using an interpolation algorithm.

The simulation image includes simulation pixels arranged in an array, and each photosensitive pixel corresponds to one simulation pixel. In at least one embodiment, there is a one-to-one correspondence between the photosensitive pixels and the simulation pixels.

With the image processing method according to embodiments of the present disclosure, in a HDR mode, the multiple frames of color-block image are merged, and then merged HDR color-block image is converted, rather than converting each frame of color-block image into the simulation image and then merging. In an embodiment of the present disclosure, only a conversion from the color-block image into the simulation image is needed, thereby reducing computation and processing time of the image processing, improving an efficiency of the HDR function, and improving the user experience.

Figure 4:
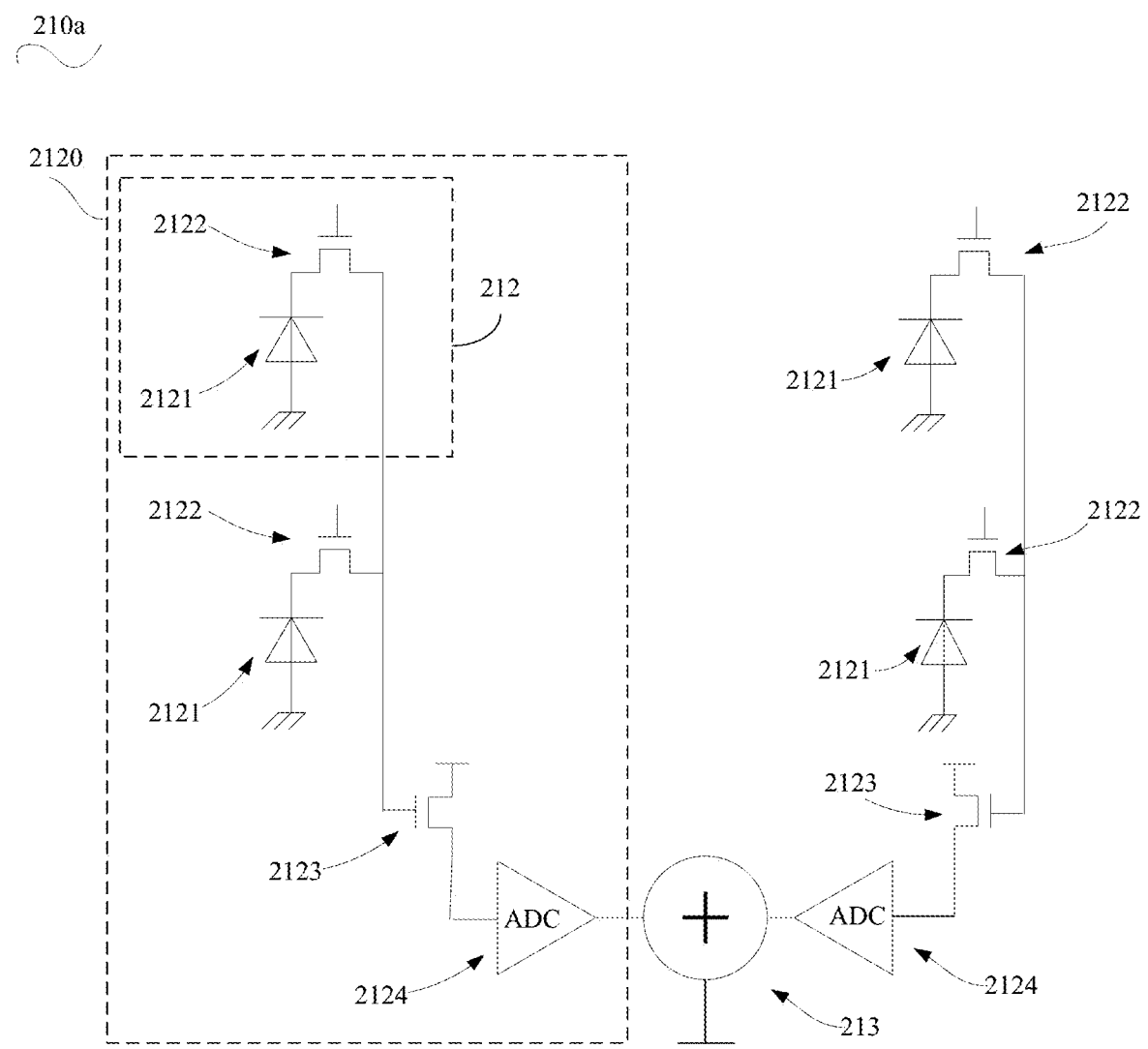
FIG. 4 is a schematic diagram illustrating a circuit of an image sensor according to an embodiment of the present disclosure.
Figure 5:
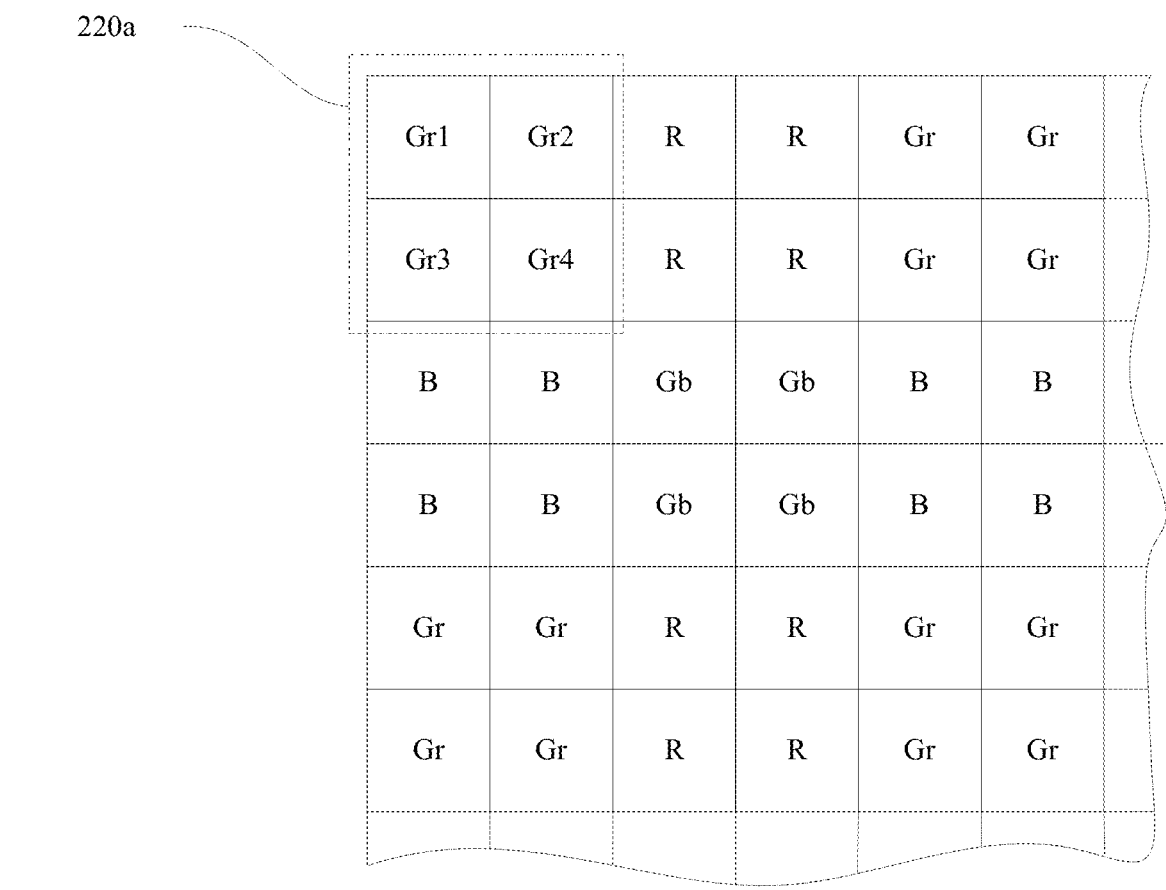
FIG. 5 is a schematic diagram of an array of filter units according to an embodiment of the present disclosure.

FIG. 4 is a schematic diagram illustrating a circuit of an image sensor according to an embodiment of the present disclosure. FIG. 5 is a schematic diagram of an array of filter units according to an embodiment of the present disclosure. FIGS. 2-5 are better viewed together.

Referring to FIGS. 2-5, the image sensor 200 according to an embodiment of the present disclosure includes an array 210 of photosensitive pixel units and an array 220 of filter units arranged on the array 210 of photosensitive pixel units.

Further, the array 210 of photosensitive pixel units includes a plurality of photosensitive pixel units 210a. Each photosensitive pixel unit 210a includes a plurality of adjacent photosensitive pixels 212. Each photosensitive pixel 212 includes a photosensitive element 2121 and a transmission tube 2122. The photosensitive element 2121 may be a photodiode, and the transmission tube 2122 may be a MOS transistor.

The array 220 of filter units includes a plurality of filter units 220a. Each filter unit 220a corresponding to one photosensitive pixel unit 210a.

In detail, in some examples, the filter units are arranged in a Bayer array. In at least one embodiment, four adjacent filter units 220a include one red filter unit, one blue filter unit and two green filter units.

Each photosensitive pixel unit 210a corresponds to a filter unit 220a with a same color. If a photosensitive pixel unit 210a includes n adjacent photosensitive elements 2121, one filter unit 220a covers n photosensitive elements 2121 in one photosensitive pixel unit 210a. The filter unit 220a may be formed integrally, or may be formed by assembling n separate sub filters.

In some implementations, each photosensitive pixel unit 210a includes four adjacent photosensitive pixels 212. Two adjacent photosensitive pixels 212 collectively form one photosensitive pixel subunit 2120. The photosensitive pixel subunit 2120 further includes a source follower 2123 and an analog-to-digital converter 2124. The photosensitive pixel unit 210a further includes an adder 213. A first electrode of each transmission tube 2122 in the photosensitive pixel subunit 2120 is coupled to a cathode electrode of a corresponding photosensitive element 2121. Second electrodes of all the transmission tubes 2122 are collectively coupled to a gate electrode of the source follower 2123 and coupled to an analog-to-digital converter 2124 via the source electrode of the source follower 2123. The source follower 2123 may be a MOS transistor. Two photosensitive pixel subunits 2120 are coupled to the adder 213 via respective source followers 2123 and respective analog-to-digital converters 2124.

In at least one embodiment, four adjacent photosensitive elements 2121 in one photosensitive pixel unit 210a of the image sensor 200 according to an embodiment of the present disclosure collectively use one filter unit 220a with a same color as the photosensitive pixel unit. Each photosensitive element 2121 is coupled to a transmission tube 2122 correspondingly. Two adjacent photosensitive elements 2121 collectively use one source follower 2123 and one analog-digital converter 2124. Four adjacent photosensitive elements 2121 collectively use one adder 213.

Further, four adjacent photosensitive elements 2121 are arranged in a 2-by-2 array. Two photosensitive elements 2121 in one photosensitive pixel subunit 2120 can be in a same row.

During an imaging process, when four photosensitive elements 2121 covered by a same filter unit 220a are exposed simultaneously, the color-block image can be outputted by the image processing.

In detail, the photosensitive element 2121 is configured to convert light into charges, and the amount of the charges is proportional to an illumination intensity. The transmission tube 2122 is configured to control a circuit to turn on or off according to a control signal. When the circuit is turned on, the source follower 2123 is configured to convert the charge generated through light illumination into a voltage signal. The analog-to-digital converter 2124 is configured to convert the voltage signal into a digital signal. The adder 2122 is configured to add and output two digital signals.

Referring to FIG. 6, take an image sensor 200 of 16M as an example. The image sensor according to an embodiment of the present disclosure can output photosensitive pixels 212 of 16M, i.e., the image sensor 200 outputs the color-block image. The color-block image includes image pixel units. The image pixel unit includes original pixels arranged in a 2-by-2 array. The size of the original pixel is the same as that of the photosensitive pixel. However, since filter unit 220a covering four adjacent photosensitive elements 2121 has a same color (i.e., although four photosensitive elements 2121 are exposed respectively, the filter unit 220a covers the four photosensitive elements has a same color), four adjacent original pixels in each image pixel unit of the output image have a same color, and thus the resolution of the image cannot be increased.

In some embodiments, when a color-block image is output, each photosensitive pixel 212 is output separately. Since four adjacent photosensitive pixels 212 have a same color, four adjacent original pixels in an image pixel unit have a same color, which form an untypical Bayer array. However, the untypical Bayer array cannot be directly processed. Therefore, it is required to convert the color-block image into the simulation image, and the simulation image includes simulation pixels arranged in the preset array or in the Bayer array. In this way, the image pixel unit in an untypical Bayer array can be converted into simulation pixels arranged in the typical Bayer array.

Further, when the HDR mode is applied, the multiple frames of color-block image outputted under different exposure parameters are merged to obtain the color-block image in the HDR mode, that is, the HDR color-block image.

As described above, each of the image pixel units in the color-block image is arranged in untypical Bayer array. Therefore, it cannot be directly processed, and the same is true for the HDR color-block image. In at least one embodiment, if a HDR true-color image is to be output, it is required to process the HDR color-block image. For example, the HDR color-block image can be converted into the simulation image by the interpolation algorithm.

Figure 7:
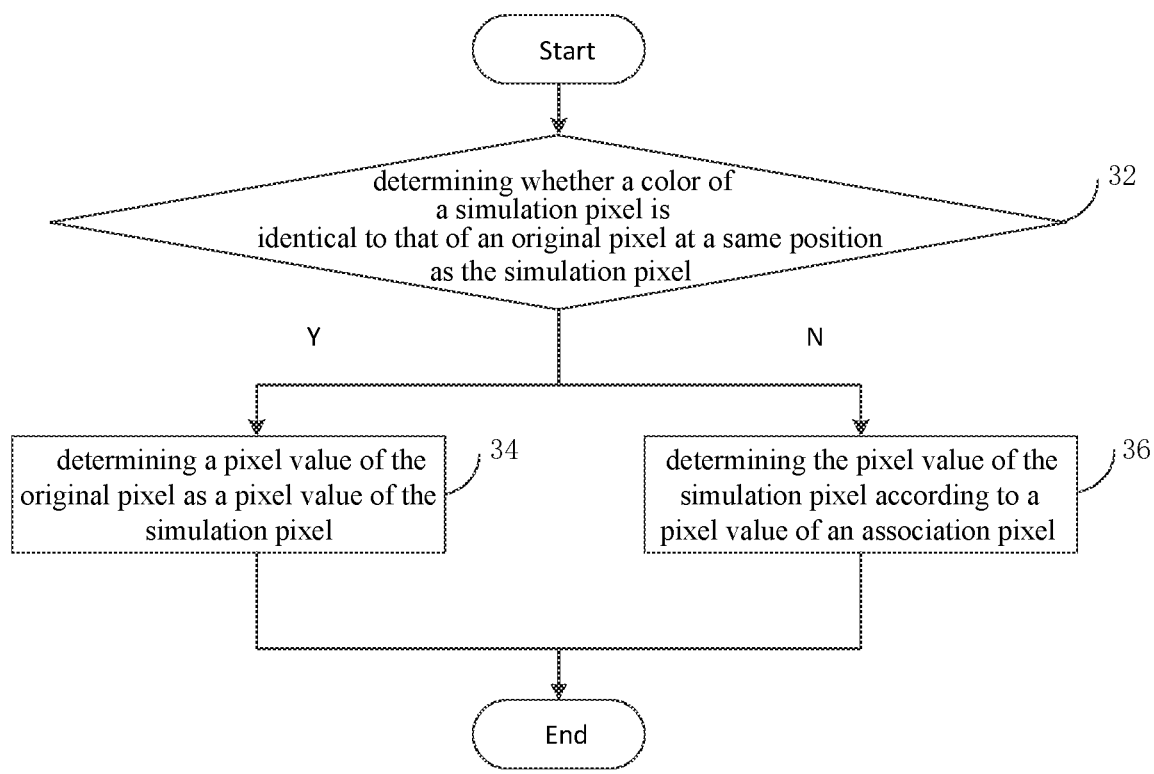
FIG. 7 is a flow chart of an image processing method according to another embodiment of the present disclosure.

Referring to FIG. 7, in some implementations, the act at block 30 includes the following.

At block 32, it is determined whether a color of a simulation pixel is identical to that of an original pixel at a same position as the simulation pixel, if yes, an act at block 34 is executed, otherwise, an act at block 36 is executed.

At block 34, a pixel value of the original pixel is determined as a pixel value of the simulation pixel.

At block 36, the pixel value of the simulation pixel is determined according to a pixel value of an association pixel.

The association pixel is selected from an image pixel unit with a same color as the simulation pixel and adjacent to an image pixel unit including the original pixel.

Figure 8:
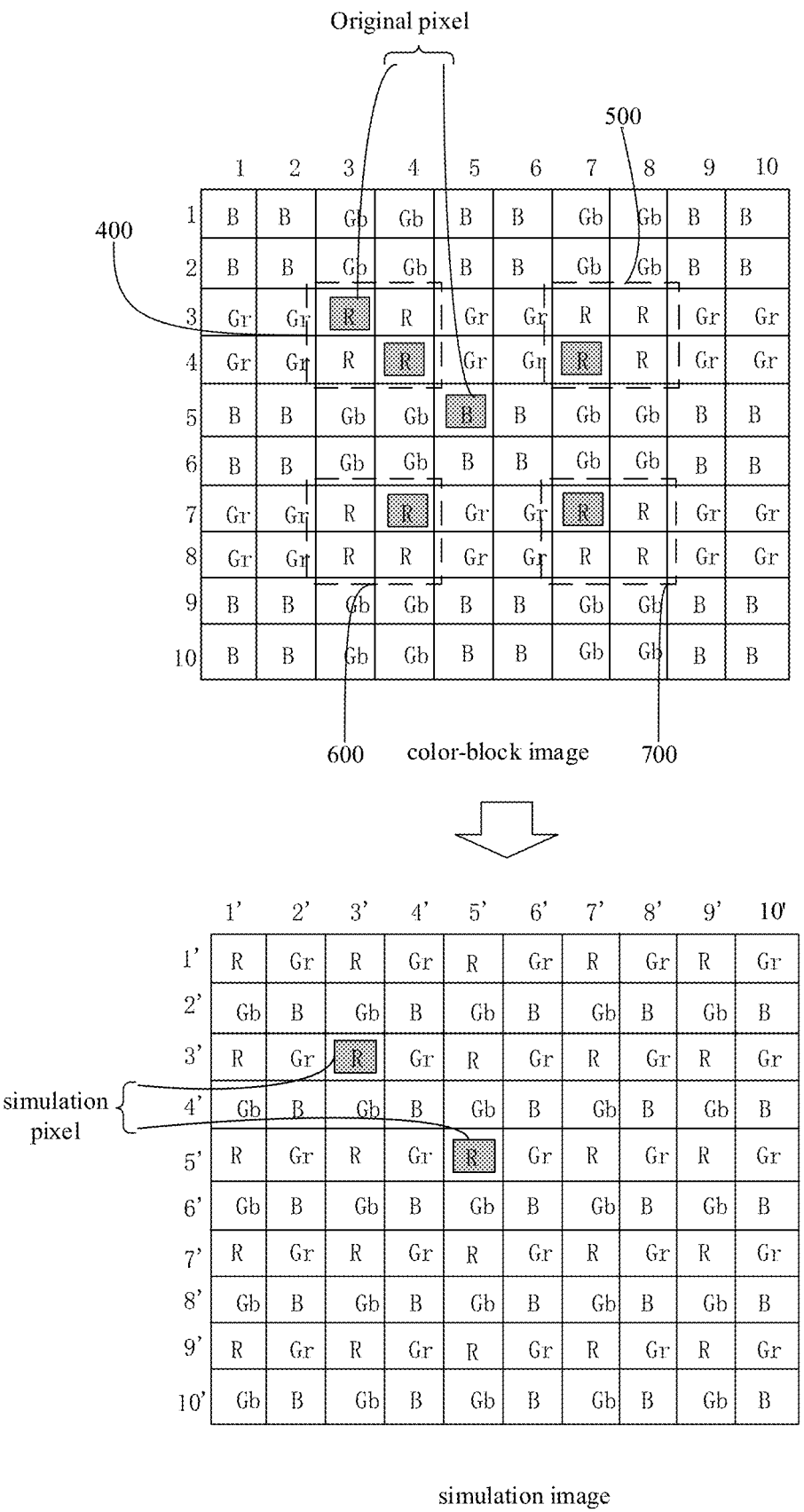
FIG. 8 is a schematic diagram illustrating a process of converting a color-block image into a simulation image according to an embodiment of the present disclosure.

Referring to FIG. 8, for the simulation pixels R3'3' and R5'5', the corresponding original pixels are R33 and B55.

When the simulation pixel R3'3' is obtained, since the simulation pixel R3'3' has the same color as the corresponding original pixel R33, the pixel value of the original pixel R33 is directly determined as the pixel value of the simulation pixel R3'3' during conversion.

When the simulation pixel R5'5' is obtained, since the simulation pixel R5'5' has a color different from that of the corresponding original pixel B55, the pixel value of the original pixel B55 cannot be directly determined as the pixel value of the simulation pixel R5'5', and it is required to calculate the pixel value of the simulation pixel R5'5' according to an association pixel of the simulation pixel R5'5' by the interpolation algorithm.

It should be noted that, a pixel value of a pixel mentioned in the context should be understood in a broad sense as a color attribute value of the pixel, such as a color value.

The association pixel is selected from an association pixel unit. There may be more than one association pixel unit for each simulation pixel, for example, there may be four association pixel units, in which the association pixel units have the same color as the simulation pixel and are adjacent to the original pixel at the same position as the simulation pixel.

It should be noted that, "adjacent" here should be understood in a broad sense. Take FIG. 8 as an example, the simulation pixel R5'5' corresponds to the original pixel B55. The image pixel units 400, 500, 600 and 700 are selected as the association pixel units, but other red image pixel units far away from the image pixel unit where the original pixel B55 is located are not selected as the association pixel units. In each association pixel unit, the red original pixel closest to the original pixel B55 is selected as the association pixel, which means that the association pixels of the simulation pixel R5'5' include the original pixels R44, R74, R47 and R77. The simulation pixel R5'5' is adjacent to and has the same color as the original pixels R44, R74, R47 and R77.

In different cases, the original pixels can be converted into the simulation pixels in different ways, thus converting the HDR color-block image into the simulation image. Since the image sensor 200 adopts the filters in the Bayer array, the signal-to-noise ratio of the image is improved. During the image processing procedure, the interpolation processing is performed on the HDR color-block image, such that the distinguishability and resolution of the image can be improved.

Figure 9:
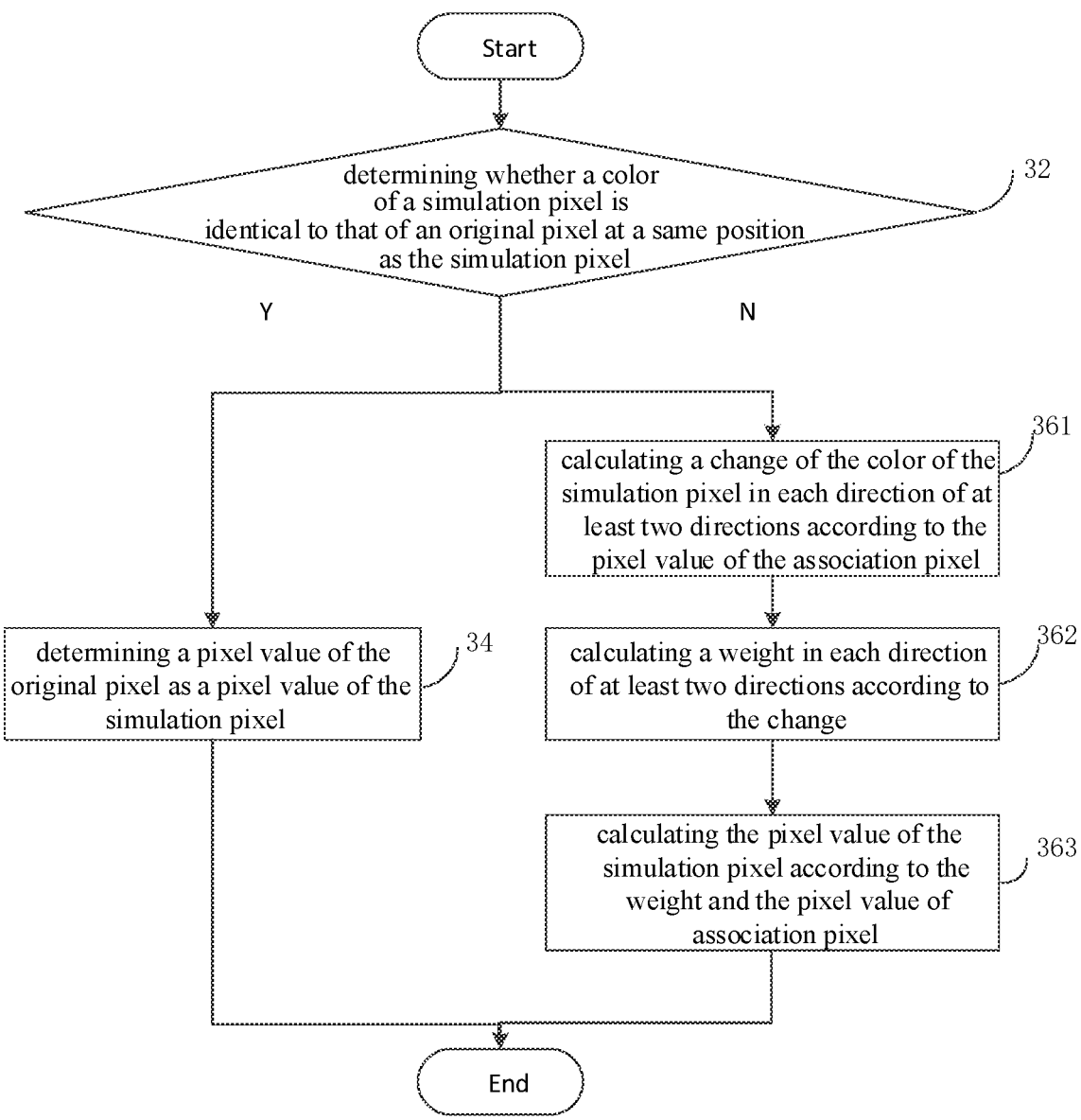
FIG. 9 is a flow chart of an image processing method according to an embodiment of the present disclosure.

Referring to FIG. 9, in some implementations, the act at block 36 (i.e., determining the pixel value of the simulation pixel according to the pixel value of the association pixel) includes the following.

At block 361, a change of the color of the simulation pixel in each direction of at least two directions is calculated according to the pixel value of the association pixel.

At block 362, a weight in each direction of the at least two directions is calculated according to the change.

At block 363, the pixel value of the simulation pixel is calculated according to the weight and the pixel value of the association pixel.

In detail, the interpolation processing is realized as follows: with reference to energy changes of the image in different directions and according to weights of the association pixels in different directions, the pixel value of the simulation pixel is calculated by a linear interpolation. From the direction having a smaller energy change, it can get a higher reference value, i.e., the weight for this direction in the interpolation is high.

In some examples, for sake of convenience, only the horizontal direction and the vertical direction are considered.

The pixel value of the simulation pixel R5'5' is obtained by an interpolation based on the original pixels R44, R74, R47 and R77. Since there is no original pixel with a same color as the simulation pixel (i.e., R) in the horizontal direction and the vertical direction of the original pixel R55 corresponding the simulation pixel R5'5', a component of this color (i.e., R) in each of the horizontal direction and the vertical direction is calculated according to the association pixels. The components in the horizontal direction are R45 and R75, the components in the vertical direction are R54 and R57. All the components can be calculated according to the original pixels R44, R74, R47 and R77.

In detail, R45=R44*2/3+R47*1/3, R75=2/3*R74+1/3*R77, R54=2/3*R44+1/3*R74, R57=2/3*R47+1/3*R77.

The change of color and the weight in each of the horizontal direction and the vertical direction are calculated respectively. In at least one embodiment, according to the change of color in each direction, the reference weight in each direction used in the interpolation is determined. The weight in the direction with a small change is high, while the weight in the direction with a big change is low. The change in the horizontal direction is X1=|R45-R75|. The change in the vertical direction is X2=|R54-R57|, W1=X1/(X1+X2), W2=X2/(X1+X2).

After the above calculation, the pixel value of the simulation pixel R5'5' can be calculated as R5'5'=(2/3*R45+1/3*R75)*W2+(2/3*R54+1/3*R57)*W1. It can be understood that, if X1>X2, then W1>W2. The weight in the horizontal direction is W2, and the weight in the vertical direction is W1, vice versa.

Accordingly, the pixel value of the simulation pixel can be calculated by the interpolation algorithm. After the calculations on the association pixels, the original pixels can be converted into the simulation pixels arranged in the typical Bayer array. In at least one embodiment, four adjacent simulation pixels arranged in the 2-by-2 array include one red simulation pixel, two green simulation pixels and one blue simulation pixel.

It should be noted that, the interpolation processing is not limited to the above-mentioned method, in which only the pixel values of pixels with a same color as the simulation pixel in the vertical direction and the horizontal direction are considered during calculating the pixel value of the simulation pixel. In other embodiments, pixel values of pixels with other colors can also be considered.

Figure 10:
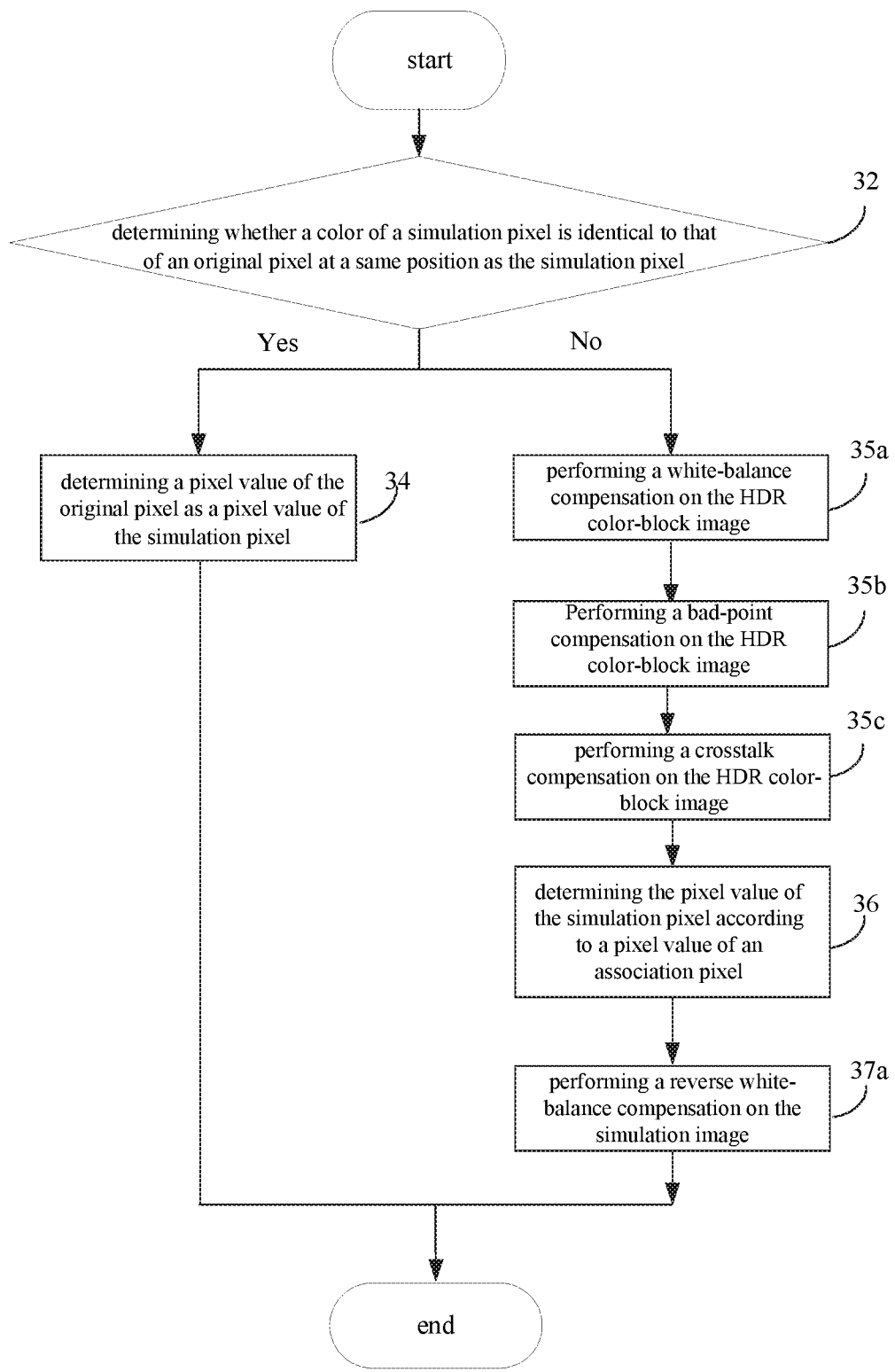
FIG. 10 is a flow chart of an image processing method according to an embodiment of the present disclosure. FIG.

Referring to FIG. 10, in some embodiments, before the act at block 36, the method further includes performing a white-balance compensation on the HDR color-block image, as illustrated at block 35a.

Accordingly, after the act at 36, the method further includes performing a reverse white-balance compensation on the simulation image, as illustrated at block 37a.

In detail, in some examples, when converting the HDR color-block image into the simulation image, during the interpolation, the red and blue simulation pixels not only refer to the color weights of original pixels having the same color as the simulation pixels, but also refer to the color weights of original pixels with the green color. Thus, it is required to perform the white-balance compensation before the interpolation to exclude an effect of the white-balance in the interpolation calculation. In order to avoid the white-balance of the color-block image, it is required to perform the reverse white-balance compensation after the interpolation according to gain values of the red, green and blue colors in the compensation.

In this way, the effect of the white-balance in the interpolation calculation can be excluded, and the simulation image obtained after the interpolation can keep the white-balance of the color-block image.

Referring to FIG. 10 again, in some implementations, before the act at block 36, the method further includes performing a bad-point compensation on the HDR color-block image, as illustrated at block 35b.

It can be understood that, limited by the manufacturing process, there may be bad points in the image sensor 200. The bad point presents a same color all the time without varying with the photosensibility, which affects quality of the image. In order to ensure an accuracy of the interpolation and prevent from the effect of the bad points, it is required to perform the bad-point compensation before the interpolation.

In detail, during the bad-point compensation, the original pixels are detected. When an original pixel is detected as the bad point, the bad-point compensation is performed according to pixel values of other original pixels in the image pixel unit where the original pixel is located.

In this way, the effect of the bad point on the interpolation can be avoided, thus improving the quality of the image.

Referring to FIG. 10 again, in some implementations, before the act at block 36, the method includes performing a crosstalk compensation on the HDR color-block image, as illustrated at block 35c.

In detail, four photosensitive pixels in one photosensitive pixel unit cover the filters with the same color, and the photosensitive pixels 212 have differences in photosensibility, such that fixed spectrum noise may occur in pure-color areas in the simulation true-color image outputted after converting the simulation image and the quality of the image may be affected. Therefore, it is required to perform the crosstalk compensation.

Figure 11:
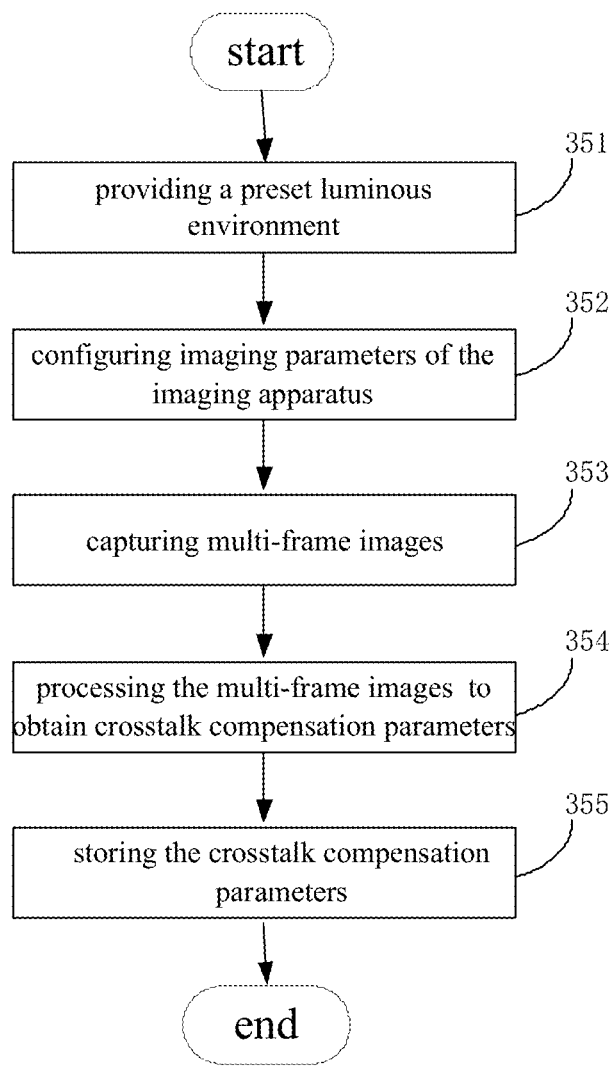

Referring to FIG. 11, as explained above, in order to perform the crosstalk compensation, it is required to obtain the compensation parameters during the manufacturing process of the image sensor 200, and to store the parameters related to the crosstalk compensation into the storage of the imaging apparatus or the electronic device provided with the imaging apparatus, such as the mobile phone or tablet computer.

In some implementations, an act of setting the compensation parameters may include the following.

At block 351, a preset luminous environment is provided.

At block 352, imaging parameters of the imaging apparatus are configured.

At block 353, multi-frame images are captured.

At block 354, the multi-frame images are processed to obtain crosstalk compensation parameters.

At block 355, the crosstalk compensation parameters are stored.

The preset luminous environment, for example, may include an LED uniform plate having a color temperature of about 5000K and a brightness of about 1000 lux. The imaging parameters may include a gain value, a shutter value and a location of a lens. After setting the related parameters, the crosstalk compensation parameters can be obtained.

During the process, multiple color-block images are obtained using the preset imaging parameters in the preset luminous environment, and combined into one combination color-block image, such that the effect of noise caused by using a single color-block image as reference can be reduced.

Referring to FIG. 12, take the image pixel unit Gr as an example. The image pixel unit Gr includes original pixels Gr1, Gr2, Gr3 and Gr4. The purpose of the crosstalk compensation is to adjust the photosensitive pixels which may have different photosensibilities to have the same photosensibility. An average pixel value of the image pixel unit is Gr_avg=(Gr1+Gr2+Gr3+Gr4)/4, which represents an average level of photosensibilities of the four photosensitive pixels. By configuring the average value as a reference value, ratios of Gr1/Gr_avg, Gr2/Gr_avg, Gr3/Gr_avg and Gr4/Gr_avg are calculated. It can be understood that, by calculating a ratio of the pixel value of each original pixel to the average pixel value of the image pixel unit, a deviation between each original pixel and the reference value can be reflected. Four ratios can be recorded in a storage of a related device as the compensation parameters, and can be retrieved during the imaging process to compensate for each original pixel, thus reducing the crosstalk and improving the quality of the image.

Generally, after setting the crosstalk compensation parameters, verification is performed on the parameters to determine the accuracy of the parameters.

During the verification, a color-block image is obtained with the same luminous environment and same imaging parameters as the preset luminous environment and the preset imaging parameters, and the crosstalk compensation is performed on the color-block image according to the calculated compensation parameters to calculate compensated Gr'_avg, Gr'1/Gr'_avg, Gr'2/Gr'_avg, Gr'3/Gr'_avg and Gr'4/Gr'_avg. The accuracy of parameters can be determined according to the calculation results from a macro perspective and a micro perspective. From the micro perspective, when a certain original pixel after the compensation still has a big deviation which is easy to be sensed by the user after the imaging process, it means that the parameters are not accurate. From the macro perspective, when there are too many original pixels with deviations after the compensation, the deviations as a whole can be sensed by the user even if a single original pixel has a small deviation, and in this case, the parameters are also not accurate. Thus, a ratio threshold can be set for the micro perspective, and another ratio threshold and a number threshold can be set for the macro perspective. In this way, the verification can be performed on the crosstalk compensation parameters to ensure the accuracy of the compensation parameters and to reduce the effect of the crosstalk on the quality of the image.

Referring to FIG. 13, in some implementations, after the act at block 36, the method further includes performing at least one of a mirror shape correction, a demosaicking processing, a denoising processing and an edge sharpening processing on the simulation image, as illustrated at block 37b.

It can be understood that, after the HDR color-block image is converted into the simulation image, the simulation pixels are arranged in the typical Bayer array. The simulation image can be processed, during which, the mirror shape correction, the demosaicking processing, the denoising processing and the edge sharpening processing are included, such that the processed image can be converted into the true-color image.

In another aspect, the present disclosure also provides an image processing apparatus.

FIG. 14 is a block diagram of an image processing apparatus according to an embodiment of the present disclosure. Referring to FIG. 14, an image processing apparatus 100 is illustrated. The image processing apparatus 100 is applied in an electronic device. The electronic device includes an imaging apparatus including an image sensor 200. As illustrated above, the image sensor 200 includes an array 210 of photosensitive pixel units and an array 220 of filter units arranged on the array 210 of photosensitive pixel units. Each filter unit 220a corresponds to one photosensitive pixel unit 210a, and each photosensitive pixel unit 210a includes a plurality of photosensitive pixels 212. In at least one embodiment, there is a one-to-one correspondence between the photosensitive pixel units and the filter units. The image processing apparatus 100 includes a non-transitory computer-readable medium 160 and an instruction execution system 180. The non-transitory computer-readable medium 160 includes computer-executable instructions stored thereon. The instruction execution system 180 is configured by the instructions stored in the medium 160 to perform at least one of a control module 110, a merging module 120 and a converting module 130.

The control module 110 is configured to control the array of photosensitive pixel units to expose with different exposure parameters and output multiple frames of color-block image. Each frame of color-block image includes image pixel units arranged in a preset array. Each image pixel unit includes a plurality of original pixels, and each photosensitive pixel 212 corresponds to one original pixel. In at least one embodiment, there is a one-to-one correspondence between the photosensitive pixels and the original pixels. The merging module 120 is configured to merge the multiple frames of color-block image to obtain a HDR color-block image. The converting module 130 is configured to convert the HDR color-block image into a simulation image using an interpolation algorithm. The simulation image includes simulation pixels arranged in an array, and each photosensitive pixel 212 corresponds to one simulation pixel. In at least one embodiment, there is a one-to-one correspondence between the photosensitive pixels and the simulation pixels.

In at least one embodiment, the act at block 10 can be implemented by the control module 110. The act at block 20 can be implemented by the merging module 120. The act at block 30 can be implemented by the converting module 130.

Referring to FIG. 15, in some implementations, the converting module 130 includes a first determining unit 132, a second determining unit 134, and a third determining unit 136. The first determining unit 132 is configured to determine whether a color of a simulation pixel is identical to that of an original pixel at a same position as the simulation pixel. The second determining unit 134 is configured to determine a pixel value of the original pixel as a pixel value of the simulation pixel when the color of the simulation pixel is identical to that of the original pixel at the same position as the simulation pixel. The third determining unit 136 is configured to determine the pixel value of the simulation pixel according to pixel values of association pixels when the color of the simulation pixel is different from that of the original pixel at the same position as the simulation pixel. The association pixels are selected from an image pixel unit with a same color as the simulation pixel and adjacent to the image pixel unit including the original pixel.

In at least one embodiment, the act at block 32 can be implemented by the first determining module 132. The act at block 34 can be implemented by the second determining module 134. The act at block 36 can be implemented by the third determining module 136.

Referring to FIG. 16, in some implementations, the third determining unit 136 includes a first calculating subunit 1361, a second calculating subunit 1362 and a third calculating subunit 1363. The first calculating subunit 1361 is configured to calculate a change of the color of the simulation pixel in each direction of at least two directions according to the pixel value of the association pixel. The second calculating subunit 1362 is configured to calculate a weight in each direction of the at least two directions according to the change. The third calculating subunit 1363 is configured to calculate the pixel value of the simulation pixel according to the weight and the pixel value of the association pixel.

In at least one embodiment, the act at block 361 can be implemented by the first calculating subunit 1361. The act at block 362 can be implemented by the second calculating subunit 1362. The act at block 363 can be implemented by the third calculating subunit1363.

Referring to FIG. 17, in some implementations, the converting module 130 further includes a first compensating unit 135*a* and a restoring unit 137*a*. The first compensating unit 135*a* is configured to perform a white-balance compensation on the HDR color-block image. The restoring unit 137*a* is configured to perform a reverse white-balance compensation on the simulation image.

In at least one embodiment, the act at block 35*a* can be implemented by the first compensating unit 135*a*. The act at block 37*a* can be implemented by the restoring unit 137*a*.

Referring to FIG. 17 again, in some implementations, the converting module 130 further includes at least one of a second compensating unit 135*b* and a third compensating unit 135*c*. The second compensating unit 135*b* is configured to perform a bad-point compensation on the HDR color-block image. The third compensating unit 135*c* is configured to perform a crosstalk compensation on the HDR color-block image.

In at least one embodiment, the act at block 35*b* can be implemented by the second compensating unit 135*b*. The act at block 35*c* can be implemented by the third compensating unit 135*c*.

Referring to FIG. 18, in some implementations, the converting module 130 includes a processing unit 137*b*. The processing unit 137*b* is configured to perform at least one of a mirror shape correction, a demosaicking processing, a denoising processing and an edge sharpening processing on the simulation image. In at least one embodiment, the act at block 37*b* can be implemented by the processing unit 137*b*.

The present disclosure also provides an electronic device.

FIG. 19 is a block diagram of an electronic device according to an embodiment of the present disclosure. Referring to FIG. 19, the electronic device 10000 of the present disclosure includes a housing 10001, a processor 10002, a memory 10003, a circuit board 10006, a power supply circuit 10007 and an imaging apparatus 2000. The circuit board 10006 is enclosed by the housing 10001. The processor 10002 and the memory 10003 are positioned on the circuit board 10006. The power supply circuit 10007 is configured to provide power for respective circuits or components of the electronic device 10000. The memory 10003 is configured to store executable program codes.

The imaging apparatus 2000 includes an image sensor 200. As illustrated above, the image sensor 200 includes an array 210 of photosensitive pixel units and an array 220 of filter units arranged on the array 210 of photosensitive pixel units. Each filter unit 220*a* corresponds to one photosensitive pixel unit 210*a*, and each photosensitive pixel unit 210*a* includes a plurality of photosensitive pixels 212. In at least one embodiment, there is a one-to-one correspondence between the photosensitive pixel units and the filter units.

The processor 10002 is configured to run a program corresponding to the executable program codes by reading the executable program codes stored in the memory, to perform the following operations: controlling the array of photosensitive pixel units to expose with different exposure parameters and output multiple frames of color-block image, in which, each frame of color-block image includes image pixel units arranged in a preset array, each image pixel unit includes a plurality of original pixels, and each photosensitive pixel corresponds to one original pixel; merging the multiple frames of color-block image to obtain a HDR color-block image; and converting the HDR color-block image into a simulation image using an interpolation algorithm, in which, the simulation image includes simulation pixels arranged in an array, and each photosensitive pixel corresponds to one simulation pixel.

In some implementations, the imaging apparatus includes a front camera or a real camera (not illustrated in FIG. 19).

In some implementations, the processor 10002 is configured to run a program corresponding to the executable program codes by reading the executable program codes stored in the memory, to perform converting the HDR color-block image into a simulation image using an interpolation algorithm by acts of: determining whether a color of a simulation pixel is identical to that of an original pixel at a same position as the simulation pixel; when the color of the simulation pixel is identical to that of the original pixel at the same position as the simulation pixel, determining a pixel value of the original pixel as a pixel value of the simulation pixel; and when the color of the simulation pixel is different from that of the original pixel at the same position as the simulation pixel, determining the pixel value of the simulation pixel according to a pixel value of an association pixel, in which the association pixel is selected from an image pixel unit with a same color as the simulation pixel and adjacent to an image pixel unit including the original pixel.

In some implementations, the processor 1002 is configured to run a program corresponding to the executable program codes by reading the executable program codes stored in the memory, to perform determining the pixel value of the simulation pixel according to a pixel value of an association pixel by acts of: calculating a change of the color of the simulation pixel in each direction of at least two directions according to the pixel value of the association pixel; calculating a weight in each direction of the at least two directions according to the change; and calculating the pixel value of the simulation pixel according to the weight and the pixel value of the association pixel.

In some implementations, the processor 10002 is configured to run a program corresponding to the executable program codes by reading the executable program codes stored in the memory, to perform the following operations: performing a white-balance compensation on the HDR color-block image; and performing a reverse white-balance compensation on the simulation image.

In some implementations, the processor 10002 is configured to run a program corresponding to the executable program codes by reading the executable program codes stored in the memory, to perform the following operation: performing at least one of a bad-point compensation and a crosstalk compensation on the HDR color-block image.

In some implementations, the processor 10002 is configured to run a program corresponding to the executable program codes by reading the executable program codes stored in the memory, to perform the following operations: performing at least one of a mirror shape correction, a demosaicking processing, a denoising processing and an edge sharpening processing on the simulation image.

In some implementations, the electronic device may be a mobile phone or a tablet computer, which is not limited herein.

The electronic device 10000 may further include an inputting component (not illustrated in FIG. 19). It should be understood that, the inputting component may further include one or more of the following: an inputting interface, a physical button of the electronic device 10000, a microphone, etc.

It should be understood that, the electronic device 10000 may further include one or more of the following components (not illustrated in FIG. 19): an audio component, an input/output (I/O) interface, a sensor component and a communication component. The audio component is configured to output and/or input audio signals, for example, the audio component includes a microphone. The I/O interface is configured to provide an interface between the processor 10002 and peripheral interface modules. The sensor component includes one or more sensors to provide status assessments of various aspects of the electronic device 10000. The communication component is configured to facilitate communication, wired or wirelessly, between the electronic device 10000 and other devices.

It is to be understood that phraseology and terminology used herein with reference to device or element orientation (such as, terms like "center", "longitudinal", "lateral", "length", "width", "height", "up", "down", "front", "rear", "left", "right", "vertical", "horizontal", "top", "bottom", "inside", "outside", "clockwise", "anticlockwise", "axial", "radial", "circumferential") are only used to simplify description of the present invention, and do not indicate or imply that the device or element referred to must have or operated in a particular orientation. They cannot be seen as limits to the present disclosure.

Moreover, terms of "first" and "second" are only used for description and cannot be seen as indicating or implying relative importance or indicating or implying the number of the indicated technical features. Thus, the features defined with "first" and "second" may comprise or imply at least one of these features. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements or interactions of two elements, which can be understood by those skilled in the art according to specific situations.

In the present disclosure, unless specified or limited otherwise, a structure in which a first feature is "on" a second feature may include an embodiment in which the first feature directly contacts the second feature, and may also include an embodiment in which the first feature indirectly contacts the second feature via an intermediate medium. Moreover, a structure in which a first feature is "on", "over" or "above" a second feature may indicate that the first feature is right above the second feature or obliquely above the second feature, or just indicate that a horizontal level of the first feature is higher than the second feature. A structure in which a first feature is "below", or "under" a second feature may indicate that the first feature is right under the second feature or obliquely under the second feature, or just indicate that a horizontal level of the first feature is lower than the second feature.

Various embodiments and examples are provided in the following description to implement different structures of the present disclosure. In order to simplify the present disclosure, certain elements and settings will be described. However, these elements and settings are only examples and are not intended to limit the present disclosure. In addition, reference numerals may be repeated in different examples in the disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. Moreover, those skilled in the art could combine different embodiments or different characteristics in embodiments or examples described in the present disclosure.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. A controlling method, configured to control an electronic device, wherein the electronic device comprises an imaging apparatus and a display, the imaging apparatus comprises an image sensor, the image sensor comprises an array of photosensitive pixel units and an array of filter units arranged on the array of photosensitive pixel units, each filter unit covers one corresponding photosensitive pixel unit, and each photosensitive pixel unit comprises a plurality of photosensitive pixels, the controlling method comprises:
   controlling the array of photosensitive pixel units to expose with different exposure parameters and output a plurality of color-block images, wherein, each color-block image comprises original pixels arranged in a preset array, and each photosensitive pixel corresponds to one original pixel;
   merging the plurality of color-block images to obtain a HDR (high dynamic range) color-block image;
   converting the HDR color-block image into a simulation image using an interpolation algorithm, wherein, the simulation image comprises simulation pixels arranged in the preset array; and
   wherein the controlling method further comprises:
   obtaining an average value of each image pixel unit forming the HDR color-block image;
   obtaining a crosstalk compensation parameter based on the average value; and
   performing a crosstalk compensation on the HDR color-block image based on the crosstalk compensation parameter; and
   wherein obtaining the crosstalk compensation parameter based on the average value comprises: determining a ratio of each pixel value contained in the image pixel unit to the average value of the image pixel unit as the crosstalk compensation parameter.

2. The controlling method according to claim 1, wherein the color-block image comprises image pixel units arranged in the preset array, each image pixel unit comprises a plurality of original pixels having a same color, the simulation image comprises a plurality of simulation pixels arranged in the preset array, the simulation pixel comprises a current pixel, and the original pixel comprises an association pixel corresponding to the current pixel, a position of the association pixel in the color-block image corresponds to a position of the current pixel in the simulation image, and converting the HDR color-block image into the simulation image using the interpolation algorithm comprises:
   determining whether a color of the current pixel is identical to that of the association pixel;

when the color of the current pixel is identical to that of the association pixel, determining a pixel value of the association pixel as a pixel value of the current pixel; and when the color of the current pixel is different from that of the association pixel, determining the pixel value of the current pixel according to pixel values corresponding to an association pixel unit through the interpolation algorithm, wherein the array of the image pixel units comprises the association pixel unit, and a color of the association pixel unit is identical to that of the current pixel and the association pixel unit is adjacent to the association pixel.

3. The controlling method according to claim 1, wherein the preset array comprises a Bayer array.

4. The controlling method according to claim 2, wherein the image pixel unit comprises original pixels arranged in a 2*2 array.

5. The controlling method according to claim 2, wherein, determining the pixel value of the current pixel according to the pixel values corresponding to the association pixel unit through the interpolation algorithm comprises:
calculating a change in each direction of the association pixel;
calculating a weight in each direction of the association pixel; and
calculating the pixel value of the current pixel according to the change and the weight.

6. The controlling method according to claim 2, before determining the pixel value of the current pixel according to the pixel values corresponding to the association pixel unit through the interpolation algorithm, further comprising:
performing a white-balance compensation on the HDR color-block image; and
after determining the pixel value of the current pixel according to the pixel values corresponding to the association pixel unit through the interpolation algorithm, further comprising:
performing a reverse white-balance compensation on the simulation image.

7. The controlling method according to claim 2, before determining the pixel value of the current pixel according to the pixel values corresponding to the association pixel unit through the interpolation algorithm, further comprising:
performing a bad-point compensation on the HDR color-block image.

8. The controlling method according to claim 2, after determining the pixel value of the current pixel according to the pixel values corresponding to the association pixel unit through the interpolation algorithm, further comprising:
performing a lens shading correction, a demosaicing processing, a denoising processing and an edge sharpening processing on the simulation image.

9. A controlling apparatus, configured to control an electronic device, wherein the electronic device comprises an imaging apparatus and a displayer, the imaging apparatus comprises an image sensor, the image sensor comprises an array of photosensitive pixel units and an array of filter units arranged on the array of photosensitive pixel units, each filter unit covers one corresponding photosensitive pixel unit, and each photosensitive pixel unit comprises a plurality of photosensitive pixels; the controlling apparatus comprises a non-transitory computer-readable medium comprising computer-executable instructions stored thereon, and an instruction execution system which is configured by the instructions to:
control the array of photosensitive pixel units to expose with different exposure parameters and output a plurality of color-block images, wherein, each color-block image comprises a plurality of original pixels arranged in a preset array, and each photosensitive pixel corresponds to one original pixel;
merge the plurality of color-block images to obtain a HDR (high dynamic range) color-block image; and
convert the HDR color-block image into a simulation image using an interpolation algorithm, wherein, the simulation image comprises simulation pixels arranged in a preset array;
wherein the instruction execution system is further configured to:
obtain an average value of each image pixel unit forming the HDR color-block image;
obtain a crosstalk compensation parameter based on the average value; and
perform a crosstalk compensation on the HDR color-block image based on the crosstalk compensation parameter; and
wherein the instruction execution system is further configured to determine a ratio of each pixel value contained in the image pixel unit to the average value of the image pixel unit as the crosstalk compensation parameter.

10. The controlling apparatus according to claim 9, wherein the color-block image comprises image pixel units arranged in the preset array, each image pixel unit comprises a plurality of original pixels having a same color, the simulation image comprises a plurality of simulation pixels arranged in the preset array, the plurality of simulation pixels comprise a current pixel, and the plurality of original pixels comprises an association pixel corresponding to the current pixel, a position of the association pixel in the color-block image corresponds to a position of the current pixel in the simulation image,
the instruction execution system is further configured to:
determine whether a color of the current pixel is identical to that of the association pixel;
determine a pixel value of the association pixel as a pixel value of the current pixel, when the color of the current pixel is identical to that of the association pixel; and
determine the pixel value of the current pixel according to pixel values corresponding to an association pixel unit through the interpolation algorithm, when the color of the current pixel is different from that of the association pixel, wherein pixel units comprise the association pixel unit, and a color of the association pixel unit is identical to that of the current pixel and the association pixel unit is adjacent to the association pixel.

11. The controlling apparatus according to claim 9, wherein the preset array comprises a Bayer array.

12. The controlling apparatus according to claim 10, wherein the image pixel unit comprises original pixels arranged in a 2*2 array.

13. The controlling apparatus according to claim 10, wherein the instruction execution system is further configured to:
calculate a change in each direction of the association pixel;
calculate a weight in each direction of the association pixel; and
calculate the pixel value of the current pixel according to the change and the weight.

14. The controlling apparatus according to claim 10, wherein instruction execution system is further configured to:
    perform a white-balance compensation on the HDR color-block image; and
    perform a reverse white-balance compensation on the simulation image.

15. The controlling apparatus according to claim 10, wherein instruction execution system is further configured to:
    perform a bad-point compensation on the HDR color-block image.

16. The controlling apparatus according to claim 10, wherein instruction execution system is further configured to:
    perform a lens shading correction, a demosaicing processing, a denoising processing and an edge sharpening processing on the simulation image.

17. An electronic device, comprising:
    an imaging apparatus;
    a display; and
    a controlling apparatus
    wherein the imaging apparatus comprises an image sensor, the image sensor comprises an array of photosensitive pixel units and an array of filter units arranged on the array of photosensitive pixel units, each filter unit covers one corresponding photosensitive pixel unit, and each photosensitive pixel unit comprises a plurality of photosensitive pixels; the controlling apparatus is configured to:
    control the array of photosensitive pixel units to expose with different exposure parameters and output a plurality of color-block images, wherein, each color-block image comprises a plurality of original pixels arranged in a preset array, and each photosensitive pixel corresponds to one original pixel;
    merge the plurality of color-block images to obtain a HDR (high dynamic range) color-block image; and
    convert the HDR color-block image into a simulation image using an interpolation algorithm, wherein, the simulation image comprises simulation pixels arranged in a preset array;
    wherein the controlling apparatus is further configured to:
    obtain an average value of each image pixel unit forming the HDR color-block image;
    obtain a crosstalk compensation parameter based on the average value; and
    perform a crosstalk compensation on the HDR color-block image based on the crosstalk compensation parameter; and
    the controlling apparatus is further configured to determine a ratio of each pixel value contained in the image pixel unit to the average value of the image pixel unit as the crosstalk compensation parameter.

18. The electronic device according to claim 17, wherein the color-block image comprises image pixel units arranged in the preset array, each image pixel unit comprises a plurality of original pixels having a same color, the simulation image comprises a plurality of simulation pixels arranged in the preset array, the plurality of simulation pixels comprise a current pixel, and the plurality of original pixels comprises an association pixel corresponding to the current pixel, a position of the association pixel in the color-block image corresponds to a position of the current pixel in the simulation image, and
    the controlling apparatus is further configured to:
    determine whether a color of the current pixel is identical to that of the association pixel;
    determine a pixel value of the association pixel as a pixel value of the current pixel, when the color of the current pixel is identical to that of the association pixel; and
    determine the pixel value of the current pixel according to pixel values corresponding to an association pixel unit through the interpolation algorithm, when the color of the current pixel is different from that of the association pixel, wherein pixel units comprise the association pixel unit, and a color of the association pixel unit is identical to that of the current pixel and the association pixel unit is adjacent to the association pixel.

* * * * *